US008864847B1

(12) United States Patent
Casaburi et al.

(10) Patent No.: US 8,864,847 B1
(45) Date of Patent: Oct. 21, 2014

(54) SYSTEMS AND METHODS FOR PREVENTING MOBILE DEVICE LOSS

(71) Applicants: Jim Casaburi, Rancho Palos Verdes, CA (US); Alan Gilbert, Lake Elsinore, CA (US); William Allen, Los Angeles, CA (US)

(72) Inventors: Jim Casaburi, Rancho Palos Verdes, CA (US); Alan Gilbert, Lake Elsinore, CA (US); William Allen, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 86 days.

(21) Appl. No.: 13/645,348

(22) Filed: Oct. 4, 2012

(51) Int. Cl.
*H04L 29/06* (2006.01)
*G06F 21/55* (2013.01)
*G06F 21/88* (2013.01)

(52) U.S. Cl.
CPC .............. *G06F 21/88* (2013.01); *G06F 21/552* (2013.01)
USPC .............................................. 726/35; 726/22

(58) Field of Classification Search
CPC ....................................................... G06F 21/88
USPC ...................................................... 726/35, 22
See application file for complete search history.

(56) References Cited

U.S. PATENT DOCUMENTS

2009/0201149 A1* 8/2009 Kaji ......................... 340/539.13
2010/0100972 A1* 4/2010 Lemieux et al. ................. 726/34
2010/0205187 A1* 8/2010 Bertagna ....................... 707/756

OTHER PUBLICATIONS

Reclus, Fabrice, and Kristen Drouard. "Geofencing for fleet & freight management." Intelligent Transport Systems Telecommunications,(ITST), 2009 9th International Conference on. IEEE, 2009.*
Gadget Trak; http://www.gadgettrak.com/; Apr. 15, 2007.
Stop Theft; Stop—Security Tracking of Office Property; http://www.stoptheft.com/site/index.php; Apr. 2005.
Zahid Ghadialy; New Technologies for Mobile Phone Theft prevention; http://3g4g.blogspot.com/2010/02/new-technologies-for-mobile-phone-theft.html; Feb. 2010.
Alan Gilbert et al.; Systems and Methods for Mitigating Mobile Device Loss; U.S. Appl. No. 13/302,871, filed Nov. 22, 2011.

* cited by examiner

*Primary Examiner* — Kambiz Zand
*Assistant Examiner* — Michael Guirguis
(74) *Attorney, Agent, or Firm* — ALG Intellectual Property, LLC

(57) ABSTRACT

A computer-implemented method for preventing mobile device loss may include 1) identifying historical data specifying a plurality of past locations of a plurality of mobile computing devices, 2) identifying a current location of a mobile computing device within the plurality of mobile computing devices, 3) determining that the current location deviates from an expected location based on the historical data, and 4) performing a security measure on the mobile computing device in response to determining that the current location deviates from the expected location. Various other methods, systems, and computer-readable media are also disclosed.

20 Claims, 7 Drawing Sheets

SYSTEMS AND METHODS FOR PREVENTING MOBILE DEVICE LOSS

BACKGROUND

Computing devices have become a ubiquitous part of everyday life. For example, millions of people carry and use mobile computing devices (e.g., cellular telephones, MP3 players, laptops, Bluetooth headsets, etc.) throughout their daily activities. However, such computing devices (especially relatively small, mobile computing devices) may be easily misplaced by users and/or stolen by thieves. The loss of a mobile computing device may not only represent the loss of the value of the device to the owner, but also the loss of important data stored on the device. In addition, private or even confidential data may be stored on the device, exposing the owner of a lost device to potential privacy and/or security risks.

Traditional mobile device security systems may allow a user and/or owner to remotely activate anti-theft measures once the user realizes that the mobile device is missing and most likely stolen. Unfortunately, by the time the owner realizes that the mobile device is stolen, a thief may have already compromised the mobile device (e.g., by retrieving sensitive data from the device, wiping the device, etc.). Accordingly, the instant disclosure identifies and addresses a need for additional and improved systems and methods for mitigating mobile device loss.

SUMMARY

As will be described in greater detail below, the instant disclosure generally relates to systems and methods for preventing mobile device loss by using historical data describing past locations of multiple (e.g., commonly owned) mobile devices to determine where one of the mobile devices is expected to be and by automatically taking security measures if the mobile device is in an unexpected location.

In one example, a computer-implemented method for preventing mobile device loss may include 1) identifying historical data specifying a plurality of past locations of a plurality of mobile computing devices, 2) identifying a current location of a mobile computing device within the plurality of mobile computing devices, 3) determining that the current location deviates from an expected location based on the historical data, and 4) performing a security measure on the mobile computing device in response to determining that the current location deviates from the expected location.

In some examples, identifying the historical data specifying the plurality of past locations of the plurality of mobile computing devices may include determining that the plurality of mobile computing devices are owned by a single user. The historical data specifying a plurality of past locations of the mobile computing device may include any of a variety of information about the past locations of the mobile computing device. In some examples, the historical data may specify a plurality of times corresponding to the plurality of past locations of the plurality of mobile computing devices. In some examples, the computer-implemented method may also track the location of the mobile computing device to generate the historical data.

In some embodiments, in addition to identifying the current location of the mobile computing device, the computer-implemented method may identify a current time. In these embodiments, determining that the current location deviates from the expected location based on the historical data may include determining that the current location deviates from the expected location given the current time.

In some examples, determining that the current location deviates from the expected location may include determining, based on the historical data, that the expected location of the mobile computing device includes a location within a relative distance of an additional mobile computing device within the plurality of mobile computing device. Additionally or alternatively, determining that the current location deviates from the expected location may include 1) determining, based on the historical data, that the mobile computing device is expected to be in proximity to an additional mobile computing device within the plurality of mobile computing devices when the additional mobile computing device is within a predetermined geographical region and 2) determining that the additional mobile computing device is within the predetermined geographical region.

In some examples, determining that the current location deviates from the expected location may include determining that the current location deviates from the expected location by a distance beyond a predetermined threshold. Additionally or alternatively, determining that the current location deviates from the expected location may include determining, based on the historical data, that a statistical likelihood of the mobile computing device being at the current location at a current time falls below a predetermined threshold.

In some embodiments, performing the security measure may include presenting a challenge via an interface of the mobile computing device to verify that an authorized user of the mobile computing device is in possession of the mobile computing device. Additionally or alternatively, performing the security measure may include locking the mobile device, changing an access code for the mobile computing device, using a media capture device within the mobile computing device, and/or removing sensitive data from the mobile computing device.

In one embodiment, a system for implementing the above-described method may include 1) an identification module programmed to identify historical data specifying a plurality of past locations of a plurality of mobile computing devices, 2) a location module programmed to identify a current location of a mobile computing device within the plurality of mobile computing devices, 3) a determination module programmed to determine that the current location deviates from an expected location based on the historical data, and 4) a performing module programmed to perform a security measure on the mobile computing device in response to determining that the current location deviates from the expected location. The system may also include at least one processor configured to execute the identification module, the location module, the determination module, and the performing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify historical data specifying a plurality of past locations of a plurality of mobile computing devices, 2) identify a current location of a mobile computing device within the plurality of mobile computing devices, 3) determine that the current location deviates from an expected location based on the historical data, and 4) perform a security measure on the mobile computing device in response to determining that the current location deviates from the expected location.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
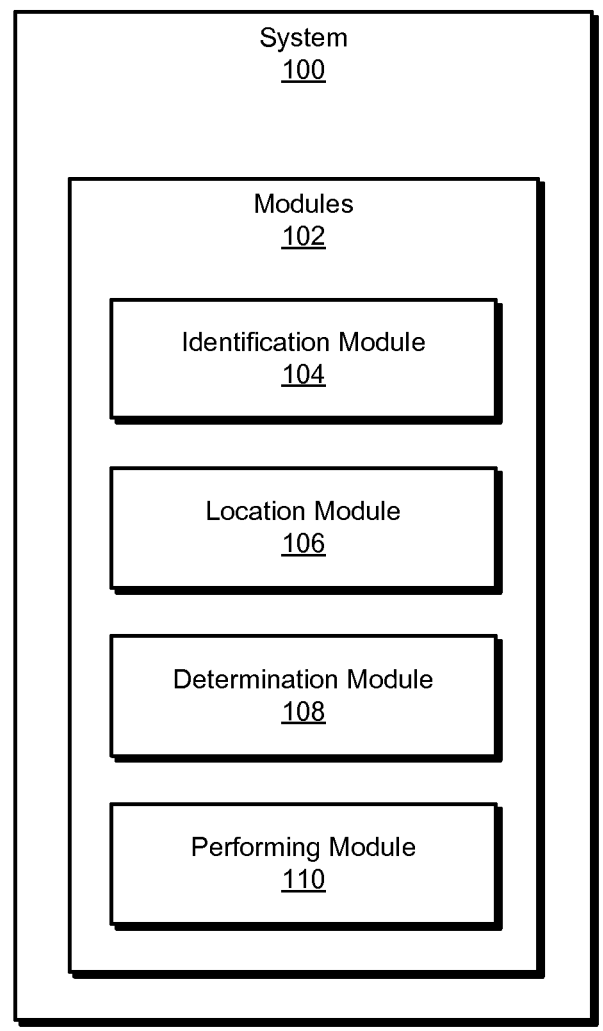
FIG. 1 is a block diagram of an exemplary system for preventing mobile device loss.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for preventing mobile device loss. As will be explained in greater detail below, by using historical data describing past locations of a mobile device and one or more additional mobile devices (e.g., under the same ownership) to determine where the mobile device is expected to be and by automatically taking security measures if the mobile device is in an unexpected location, the systems and methods described herein may potentially perform the security measures before an owner of the mobile device knows that it is missing, thereby potentially providing more effective security. Additionally, in some examples, these systems and methods may perform such security determinations with minimal or no user input regarding safe and/or expected locations.

Figure 2:
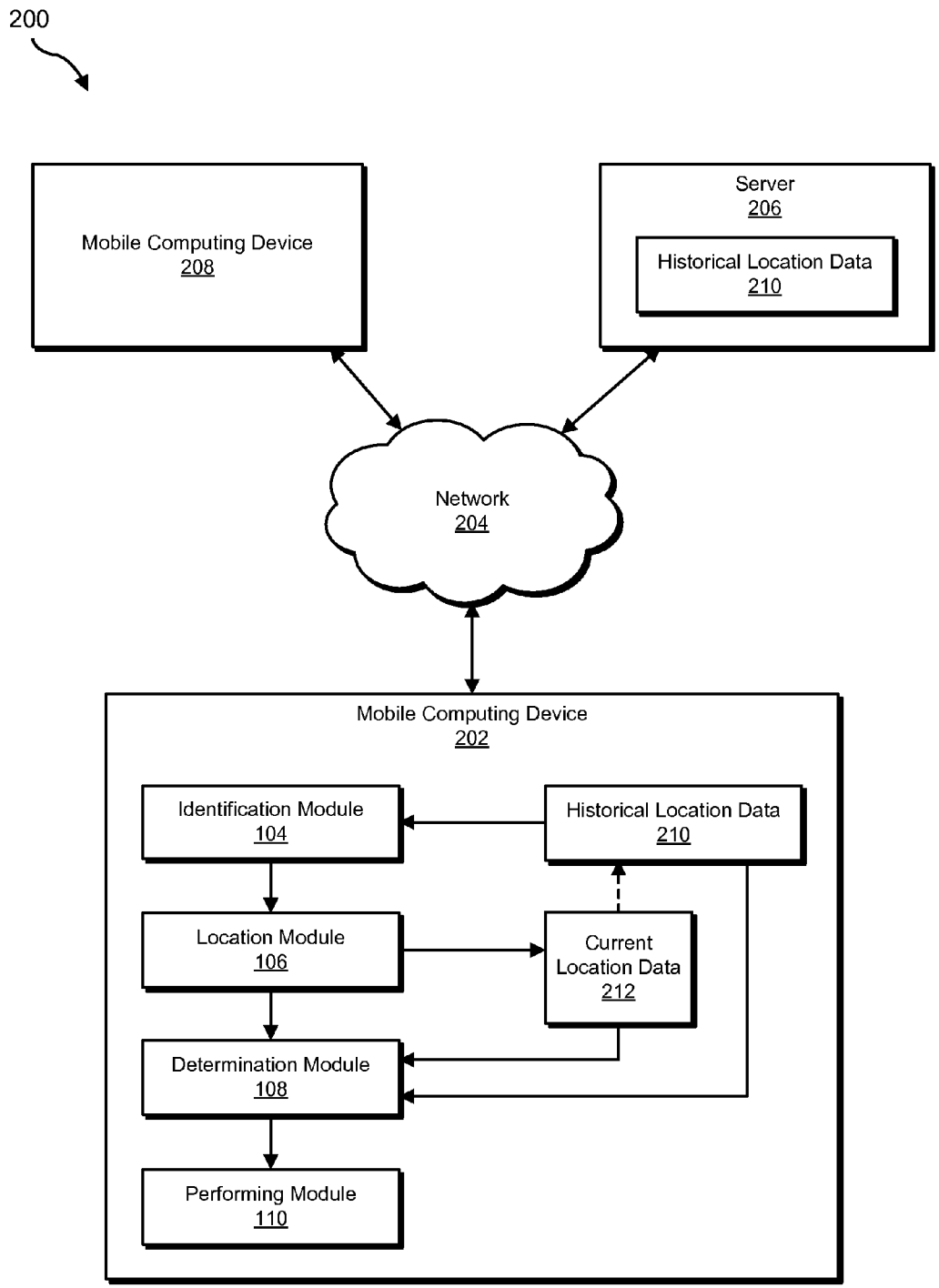
FIG. 2 is a block diagram of an exemplary system for preventing mobile device loss.

The following will provide, with reference to FIGS. 1-2, detailed descriptions of exemplary systems for preventing mobile device loss. Detailed descriptions of corresponding computer-implemented methods will also be provided in connection with FIG. 3. Detailed descriptions of exemplary location data will be provided in connection with FIGS. 4-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for preventing mobile device loss. As illustrated in this figure, exemplary system 100 may include one or more modules 102 for performing one or more tasks. For example, and as will be explained in greater detail below, exemplary system 100 may include an identification module 104 programmed to identify historical data specifying a plurality of past locations of a plurality of mobile computing devices. Exemplary system 100 may also include a location module 106 programmed to identify a current location of a mobile computing device within the plurality of mobile computing devices.

In addition, and as will be described in greater detail below, exemplary system 100 may include a determination module 108 programmed to determine that the current location deviates from an expected location based on the historical data. Exemplary system 100 may also include a performing module 110 programmed to perform a security measure on the mobile computing device in response to determining that the current location deviates from the expected location. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., mobile computing device 202, server 206, and/or mobile computing device 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a mobile computing device 202 in communication with a server 206 via a network 204. Mobile computing device 202 may be programmed with one or more of modules 102 and/or may store all or a portion of historical location data 210. Additionally or alternatively, server 206 may be programmed with one or more of modules 102 and/or may store all or a portion of historical location data 210.

In one embodiment, one or more of modules 102 from FIG. 1 may, when executed by at least one processor of mobile computing device 202, server 206, and/or mobile computing device 208, facilitate mobile computing device 202, server 206, and/or mobile computing device 208 in preventing mobile device loss. For example, and as will be described in greater detail below, one or more of modules 102 may cause mobile computing device 202, server 206, and/or mobile computing device 208 to (1) identify historical data specifying a plurality of past locations of a plurality of mobile computing devices (e.g., historical location data 210 specifying past locations of mobile computing devices 202 and 208), (2) identify a current location of the mobile computing device within the plurality of mobile computing devices (e.g., a current location of mobile computing device 202 indicated by current location data 212), (3) determine that the current location deviates from an expected location based on the historical data (e.g., determine that a location indicated by current location data 212 deviates from an expected location based on historical location data 210), and (4) perform a security measure on the mobile computing device in response to determining that the current location deviates from the expected location (e.g., performing a security measure on mobile computing device 202 in response to determining that a location indicated by current location data 212 deviates from an expected location based on historical location data 210).

Mobile computing device 202 generally represents any type or form of computing device capable of reading computer-executable instructions. Examples of mobile computing device 202 include, without limitation, cellular phones, tablet computing devices, e-book readers, laptops, netbooks, personal digital assistants (PDAs), multimedia players, embedded systems, combinations of one or more of the same, exemplary computing system 610 in FIG. 6, or any other suitable computing device.

Server 206 generally represents any type or form of computing device that is capable of storing, aggregating, relaying, transmitting, and/or serving data. Examples of server 206 include, without limitation, application servers and database servers configured to provide various database services and/or run certain software applications.

Mobile computing device 208 generally represents any type or form of computing device capable of reading computer-executable instructions. Examples of mobile computing device 208 include, without limitation, cellular phones, tablet computing devices, e-book readers, laptops, netbooks, personal digital assistants (PDAs), multimedia players, embedded systems, combinations of one or more of the same, exemplary computing system 610 in FIG. 6, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between server 206 and mobile computing devices 202 and 208.

Figure 3:
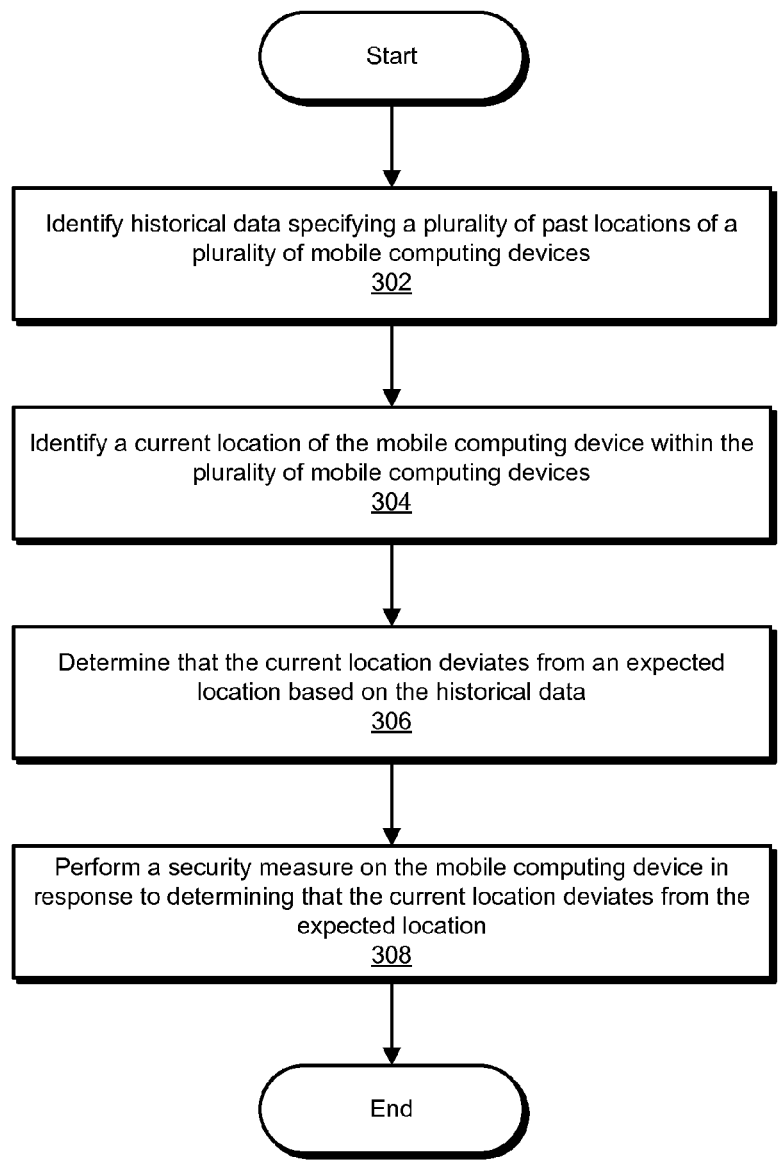
FIG. 3 is a flow diagram of an exemplary method for preventing mobile device loss.

FIG. 3 is a flow diagram of an exemplary computer-implemented method 300 for preventing mobile device loss. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify historical data specifying a plurality of past locations of a plurality of mobile computing devices. For example, at step 302 identification module 104 may, as part of mobile computing device 202 in FIG. 2, identify historical location data 210 specifying a plurality of past locations of mobile computing devices 202 and 208.

The historical data may specify any of a variety of information relating to past locations of the plurality of mobile computing devices. For example, the historical data may specify a plurality of times corresponding to the plurality of past locations of the mobile computing devices. For example, the historical data may specify the time of day at which each of the mobile computing devices was located at each of the past locations. Additionally or alternatively, the historical data may specify a date at which each of the mobile computing devices was located at each of the past locations. In some examples, the historical data may specify a day of the week, a period of the day (e.g., morning, afternoon, evening, or night), and/or any other division of time at which each of the mobile computing devices was located at each of the past locations. In some examples, the historical data may specify a direction and/or speed of travel of each mobile computing device at the time that the mobile computing device was located at each of the past locations. In one example, the historical data may include three-dimensional location data. For example, the historical data may specify past locations according to the longitude, latitude, and elevation of the mobile computing system. Additionally or alternatively, the historical data may specify the past locations according to map data (e.g., specifying one or more of the past locations in terms of street addresses and/or roads).

In some examples, the historical data may specify relative locations of the plurality of mobile computing devices. For example, the historical data may specify a distance between two of the mobile computing devices. Additionally or alternatively, the historical data may specify a distance between a mobile computing devices from the remainder of the mobile computing devices (e.g., from a weighted center describing the location of the remainder of the mobile computing devices).

Identification module 104 may identify the historical data in any of a variety of contexts. In some examples, identification module 104 may identify the historical data having previously generated at least a portion of the historical data. For example, identification module 104 may track the location of the mobile computing device to generate the historical data. Identification module 104 may track the location of the mobile computing device using any of a variety of techniques. For example, identification module 104 may query a positioning device (such as a global positioning system device) within the mobile computing system for the position of the mobile computing system. Additionally or alternatively, identification module 104 may retrieve the location from and/or calculate the location using a Wi-Fi triangulation technique, a mobile positioning technique (such as cellular signal triangulation and/or multilateration), and/or any other suitable method for locating and/or approximating the location of the mobile computing system. In some examples, identification module 104 may only track the location of the mobile computing device intermittently. For example, identification module 104 may track the location of the mobile computing device once every 15 minutes or once every hour. In this manner, identification module 104 may effectively track the mobile computing device while minimizing power and/or memory consumption on the mobile computing device.

In some examples, identification module 104 may retrieve at least a portion of the historical data from a server to which each mobile computing device within the plurality of mobile computing devices has submitted location data. In some contexts, a single user may own the plurality of mobile computing devices. For example, the plurality of mobile computing devices may be registered under a single account and may each submit location data to a central server under the same account. Accordingly, identification module 104 may determine that the plurality of mobile computing devices are owned by a single user by identifying the historical data for the plurality of mobile computing devices under a single account.

In some examples, identification module 104 may accumulate historical location data for the mobile computing devices indefinitely. Alternatively, identification module 104 may store only the most recent historical location data (e.g., over a year's time), allowing the oldest historical location data to expire.

In some examples, identification module 104 may generate the historical data entirely based on observed locations of the mobile computing devices. Alternatively, identification module 104 may also generate the historical data in part based on a user's input. For example, identification module 104 may allow a user to identify locations of interest to the user. For example, identification module 104 may allow a user to identify a home location, an office location, one or more shopping locations, etc. Additionally or alternatively, identification module 104 may retrieve annotated map data to identify common locations of interest near the user's home and/or office that the user may likely visit (e.g., shopping centers, major roads, airports, etc.). In some examples, after establishing one or more locations of interest to the user, identification module 104 may identify a likely route from one location of interest to another (e.g., from the user's home to the user's office). In these examples, identification module 104 may query the user if the likely route is the route taken by the user or if another route is normally taken by the user. In these examples, after establishing information about the user's locations of interest, the mobile computing device may periodically update the historical data based on observed locations of the mobile computing devices.

Figure 4:
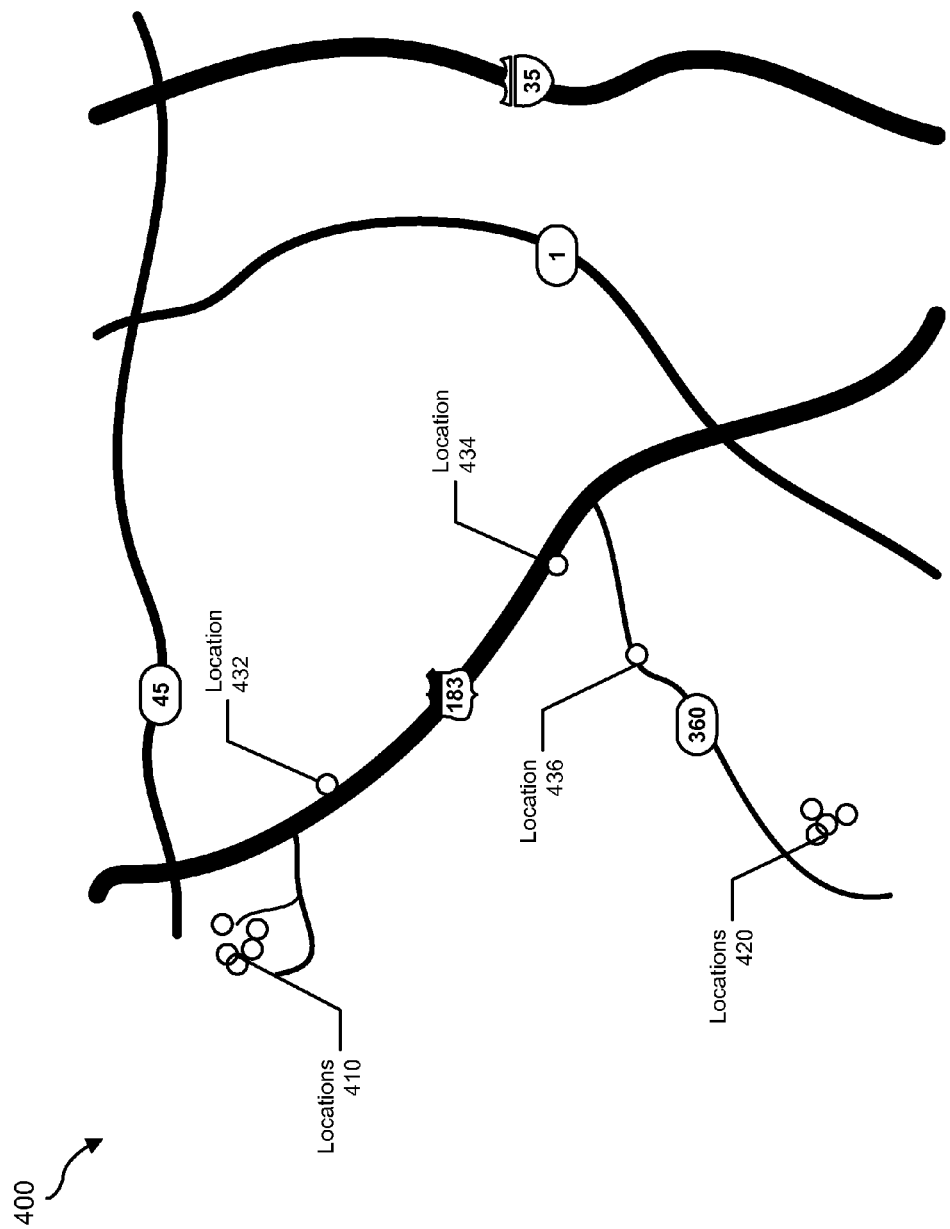
FIG. 4 is an exemplary illustration of historical location data.

FIG. 4 illustrates an exemplary historical data 400 specifying past locations of one or more of the plurality of mobile computing devices. As shown in FIG. 4, exemplary historical data 400 may include a cluster of locations 410 (e.g., in or near a user's home), a cluster of locations 420 (e.g., in or near the user's office), and locations 432, 434, and 436 (e.g., in travel between the user's home and office). Using FIG. 4 as an example, at step 302 identification module 104 may identify exemplary historical data 400. In some examples, identification module 104 may identify highway 360 and highway 183 as a part of a user's route between the user's home and office based on locations 432, 434, and 436.

Returning FIG. 3, at step 304 one or more of the systems described herein may identify a current location of the mobile computing device. For example, at step 304 location module 106 may, as part of mobile computing device 202 in FIG. 2, identify a current location of mobile computing device 202 as indicated by current location data 212.

Location module 106 may identify the current location of the mobile computing device in any suitable manner. For example, location module 106 may use any of the techniques described earlier for tracking the mobile computing device to generate the historical data. For example, location module 106 may query a positioning device (such as a global positioning system device) within the mobile computing system for the position of the mobile computing system. Additionally or alternatively, location module 106 may retrieve the location from and/or calculate the location using a Wi-Fi triangulation technique, a mobile positioning technique (such as cellular signal triangulation and/or multilateration), and/or any other suitable method for locating and/or approximating the location of the mobile computing system.

In some examples, location module 106 may identify the location of the mobile computing device intermittently. Accordingly, location module 106 may identify the current location of the mobile computing device based on a predetermined amount of time passing since the last the location of the mobile computing device was identified. In some examples, location module 106 may identify the current location of the mobile computing device by identifying a recent and/or most recently tracked location of the mobile computing device.

As mentioned earlier, in some examples the historical data may specify a plurality of times corresponding to the plurality of past locations of the mobile computing device. In these examples, location module 106 may also identify a current time (e.g., a time at which the mobile computing device is located at the current location).

Location module 106 may identify the current location of the mobile computing device in any of a variety of forms. For example, location module 106 may identify the current location in terms of global coordinates. Additionally or alternatively, location module 106 may identify the current location in terms of a street address and/or a road. In some examples, location module 106 may identify the current location in terms of a type of location (e.g., a road, a residential location, an office park, a restaurant, a gas station, a retail store, a park, etc.).

Figure 5:
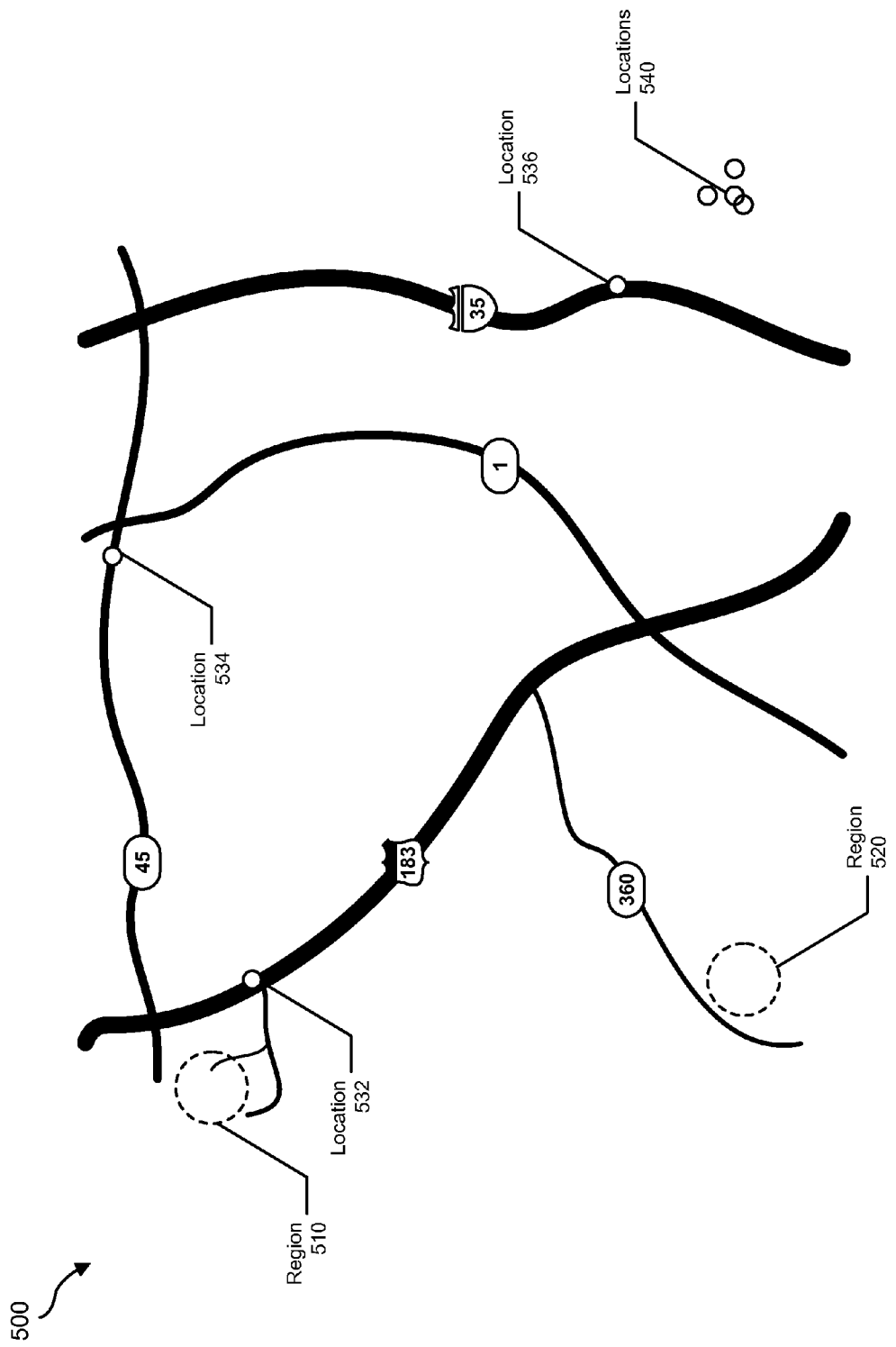
FIG. 5 is an exemplary illustration of location data.

FIG. 5 illustrates an exemplary map 500 showing an analysis of historical location data of a mobile computing device and recent location data of the mobile computing device. For example, one or more of the systems described herein may describe locations 410 of FIG. 4 with a region 510 in FIG. 5 (e.g., an area around a user's home where one or more of the plurality of mobile computing devices have been observed frequently). Likewise, one or more of the systems described herein may describe locations 420 of FIG. 4 with a region 520 in FIG. 5 (e.g., an area around a user's office where one or more of the plurality of mobile computing devices have been observed frequently). FIG. 5 may also identify recent locations 532, 534, and 536 leading to a recent cluster of locations 540. Using FIG. 5 as an example, at step 304 location module 106 may identify the current location as the most recent location within cluster of locations 540.

Returning FIG. 3, at step 306 one or more of the systems described herein may determine that the current location deviates from an expected location based on the historical data. For example, at step 306 determination module 108 may, as part of mobile computing device 202 in FIG. 2, determine that a current location of mobile computing device 202 indicated by current location data 212 deviates from an expected location based on historical location data 210.

As used herein, the phrase "expected location" may refer to any location, area, and/or sets of locations and/or areas at which the mobile computing device may be expected to be in light of the historical data. For example, the phrase "expected location" may refer to an expected proximity to one or more of the plurality of mobile computing devices. As will be explained in greater detail below, determination module 108 may use any of a variety of techniques to determine the expected location.

Determination module 108 may determine that the current location deviates from the expected location in any of a variety of ways. For example, determination module 108 may determine that the current location deviates from the expected location by 1) determining, based on the historical data, that the mobile computing device is expected to be in proximity to an additional mobile computing device within the plurality of mobile computing devices when the additional mobile computing device is within a predetermined geographical region and 2) determining that the additional mobile computing device is within the predetermined geographical region. As one example, determination module 108 may determine that a tablet computing device never leaves a user's home region without being accompanied by the user's mobile phone (e.g., thereby determining that the user's mobile phone may have been stolen). Additionally or alternatively, determination module 108 may determine that the current location deviates from the expected location by 1) determining, based on the historical data, that the mobile computing device is expected to be in proximity to an additional mobile computing device when the additional mobile computing device is outside a predetermined geographical region and 2) determining that the additional mobile computing device is outside the predetermined geographical region. For example, determination module 108 may determine that a tablet computing device never enters a user's work region without being accompanied by the user's mobile phone (e.g., thereby determining that the user's mobile phone may have been stolen).

In some examples, as mentioned earlier, the historical data may include timestamps corresponding to the location data. In these examples, determination module 108 may determine that the current location deviates from the expected location given the current time. Using FIG. 4 as an example, the cluster of locations 420 may represent a user's office. Accordingly, historical location data 400 may identify the cluster of locations 420 corresponding to times between 9:00 am and 6:00 pm on weekdays. For example, locations 420 corresponding to 9:00 am and 6:00 pm on weekdays may represent times during which a user's tablet computer and a user's mobile phone are meant to be in proximity (e.g., both within region 520 if either is within region 520) Determination module 108 may consider an area surrounding the cluster of locations 420 as an expected location on weekdays between 9:00 am and 6:00 pm, but not on weekends or at midnight. For example, the historical data may show that the tablet computer is frequently left in region 520 during night hours or on weekends while the mobile phone is taken away. However, as another example, if the mobile phone remains in region 520 and the tablet computer is removed from region 520, determination module 108 may determine that the tablet computer is not in an expected location (e.g., because the mobile phone typically only leaves region 520 when the tablet computer does, regardless of the time of day).

In some examples, determination module 108 may determine that the current location deviates from the expected location by determining that the current location deviates from the expected location beyond a predetermined threshold. For example, determination module 108 may determine that a cluster of locations specified in the historical data generally represent a single location (e.g., a user's home). Accordingly, determination module 108 may determine that the current location corresponds to the user's home if the current location is within a mile of the user's home. Additionally or alternatively, determination module 108 may analyze the cluster of locations to determine a center point of the locations and a standard deviation of the distance of the locations from the center point. Determination module 108 may then set the predetermined threshold as a predetermined number of standard deviations from the center (e.g., three standard deviations). Using FIG. 5 as an example, determination module 108 may calculate the ranges of regions 510 and 520 based on the clusters of locations 410 and 420, respectively. As another example, determination module 108 may determine that the current location deviates from the expected location only if two of the mobile computing devices are removed from each other at a distance that exceeds the predetermined threshold. For example, if two of the mobile computing devices are within 50 meters of each other, they may be considered "together" for purposes of determining whether one of the mobile computing devices is in an expected location (e.g., in proximity to the other mobile computing device). In some examples, determination module 108 may determine the proper threshold based on the historical data (e.g., how far apart the two devices are historically when in the same region).

In some examples, determination module 108 may determine that the current location deviates from the expected location based at least in part on a route of travel. For example, determination module 108 may determine that the mobile computing device is currently on a road (e.g., during a normal morning commute time) that a user could take from his home to his office, and that the office is an expected location for the mobile computing device because another of the plurality of mobile computing devices is at the office. Alternatively, determination module 108 may determine that the mobile computing device is currently on a road away from the user's office (where another of the user's mobile computing devices remains) but which does not lead to the user's home. Accordingly, determination module 108 may determine that the current location on the road deviates from the expected location.

Determination module 108 may, in some examples, analyze the historical data for patterns. For example, determination module 108 may identify a movement pattern within the historical data and determine that an arrival at the current location deviates from the movement pattern. For example, determination module 108 may determine that the current location does not represent an expected location because the current location represents a separation of the mobile computing device from another of the user's mobile computing devices in a way that is out of sequence with a user's routine. For example, determination module 108 may determine that two of the user's mobile computing devices have separated while the user was traveling down a street (e.g., walking along a sidewalk), whereas historically the mobile computing devices only have separated within certain regions and/or after which one of the mobile computing devices remained at rest.

In some examples, determination module 108 may determine that the current location is not an expected location by determining, based on the historical data, that a statistical likelihood of the mobile computing device being at the current location at a current time falls below a predetermined threshold. Determination module 108 may use any appropriate algorithm and/or formula for determining the statistical likelihood of the mobile computing device being at the current location. For example, determination module 108 may employ one or more machine learning techniques (e.g., supervised learning and/or unsupervised learning) to determine whether the current location is an expected location. In one example, determination module 108 build a Huffman tree of distance-time pairs (e.g., the distance between two mobile computing devices and the time as entered in the Huffman tree being coarse enough as to generate multiple hits over time for common distance-time pairs). In this example, determination module 108 may determine that the current distance at which the mobile computing device is from another mobile computing device is not an expected location by determining that the current distance and the current time, when added to the Huffman tree, is and/or would be distant from the root of the Huffman tree (e.g., past a predetermined threshold).

Returning FIG. 3, at step 308 one or more of the systems described herein may perform a security measure on the mobile computing device in response to determining that the current location deviates from the expected location. For example, at step 308 performing module 110 may, as part of mobile computing device 202 in FIG. 2, perform a security measure on mobile computing device 202 in response to determining that a location indicated by current location data 212 deviates from an expected location based on historical location data 210.

Performing module 110 may perform any of a variety of security measures in response to the determination. For example, performing module 110 may present a challenge via an interface of the mobile computing device to verify that an authorized user of the mobile computing device is in possession of the mobile computing device. For example, performing module 110 may present a prompt for the authorized user to enter a password and/or an unlocking sequence for the mobile computing device. In some examples, the challenge may be disguised as another function of the mobile computing system. For example, performing module 110 may present a fake instant message and check for a countersign as a response. For example, performing module 110 may present a fabricated instant message saying "Hey, are we still on for lunch today?" from "Betty" (e.g., a fake contact or a random contact stored in the user's mobile computing device). Performing module 110 may then check for a predetermined response (e.g., "127980") in response. In some examples, if the user fails the challenge, performing module 110 may enter a "theft mode" and perform one or more additional security measure. Additionally or alternatively, performing module 110 may present one or more additional challenges before and/or after entering a theft mode. In some examples, if the user passes the challenge, performing module 110 may add the current location to the historical data (e.g., as a valid and/or expected location). In some examples, performing module 110 may enforce a time limit (visible or invisible) for answering the challenge.

In some examples, performing module 110 may lock the mobile computing device in response to the determination that the current location deviates from an expected location. For example, performing module 110 may initiate a native lock state of the mobile computing device (e.g., requiring a password, a gesture, biometric data, etc. to unlock). Additionally or alternatively, performing module 110 may lock the mobile computing device until receiving remote validation that the mobile computing device has not been stolen.

In some examples, performing module 110 may change an access code for the mobile computing device in response to the determination that the current location deviates from an expected location. In one example, performing module 110 may change the access code one time. Additionally or alternatively, performing module 110 may periodically change the access code (e.g., every few minutes).

In some examples, performing module 110 may use a media capture device within the mobile computing device in response to the determination. For example, performing module 110 may use a camera in an attempt to capture one or more images of the surroundings and/or the thief of the mobile computing device. Additionally or alternatively, performing module 110 may remove sensitive data from the mobile computing device. In some examples, performing module 110 may wipe the mobile computing device of all data. Additionally or alternatively, performing module 110 may brick the mobile computing device (e.g., render the mobile computing device inoperable). In some examples, performing module 110 may restrict access to sensitive data and/or functions.

In some examples, performing module 110 may also perform one or more of the above security measures on one or more additional mobile computing devices within the plurality of mobile computing devices. For example, if two of a user's mobile computing devices unexpectedly separate, performing module 110 may lock both mobile computing devices.

Using FIG. 5 as an example, one or more of the systems described herein may identify the mobile computing device and an additional mobile computing device together within region 510. These systems may then identify the mobile computing device as leaving region 510 on highway 183 (e.g., at location 532). These systems may determine that the separation of the mobile computing device and the additional mobile computing device is normal when the mobile computing device separates from the additional mobile computing device at region 510 and continues to region 520. However, these systems may later identify the mobile computing device at location 534 on highway 45, increasing suspicion that the mobile computing device has been stolen. These systems may then identify the mobile computing device at location 536 on highway 35, further increasing suspicion that the mobile computing device has been stolen. However, in some examples these systems and methods may not yet take a security action—e.g., because the mobile computing device has remained on major highways in the general area of expected locations of the mobile computing device. These systems may then identify the mobile computing device multiple times at a cluster of locations 540 (e.g., in a residential area) where the mobile computing device had never been located, and where the additional mobile computing device is currently absent. These systems may therefore initiate a security action on the mobile computing device without user intervention.

As explained above, by using historical data describing past locations of a mobile device and one or more additional mobile devices (e.g., under the same ownership) to determine where the mobile device is expected to be and by automatically taking security measures if the mobile device is in an unexpected location, the systems and methods described herein may potentially perform the security measures before an owner of the mobile device knows that it is missing, thereby potentially providing more effective security. Additionally, in some examples, these systems and methods may perform such security determinations with minimal or no user input regarding safe and/or expected locations.

Figure 6:
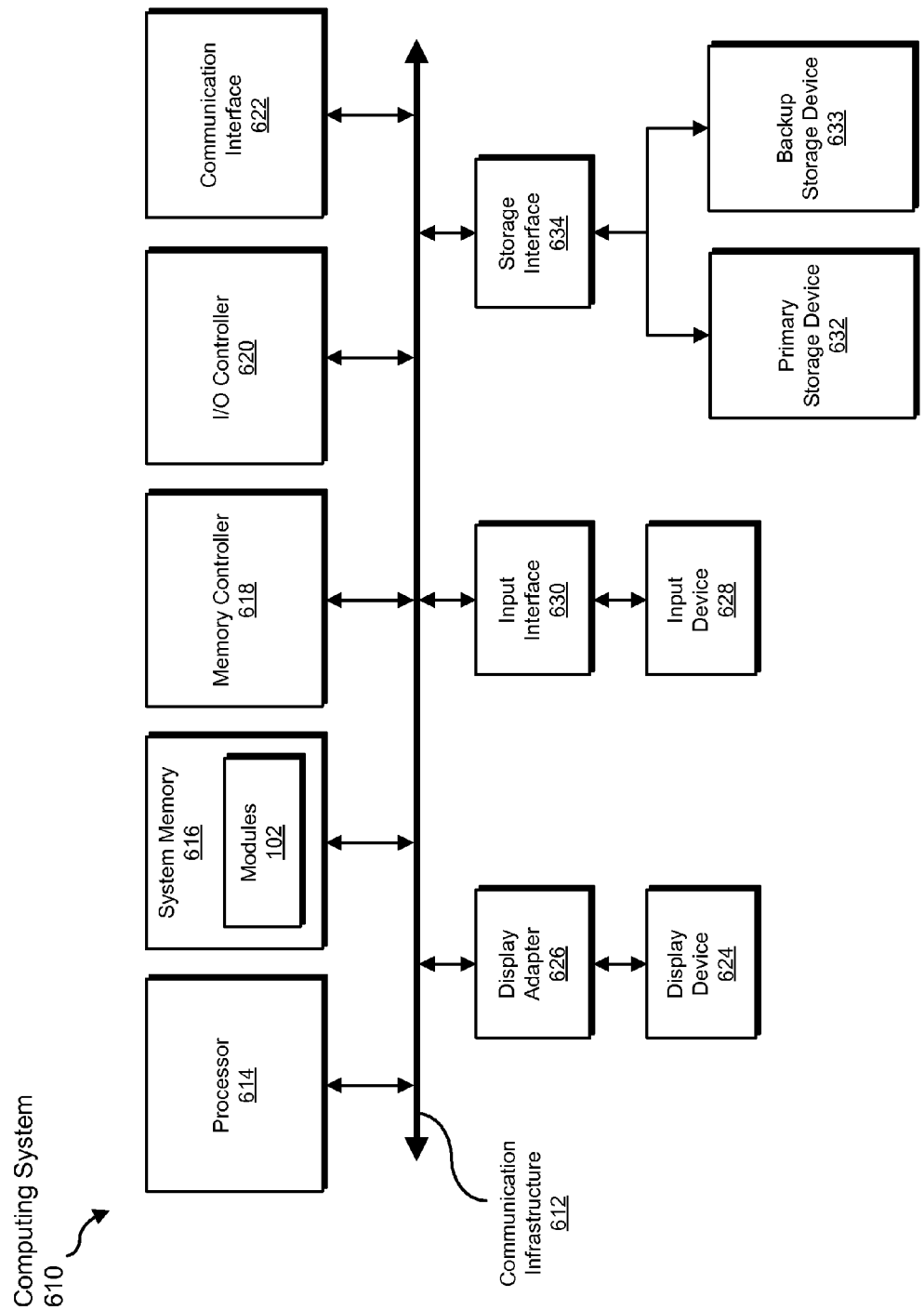
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, determining, tracking, performing, presenting, locking, changing, using, and removing steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
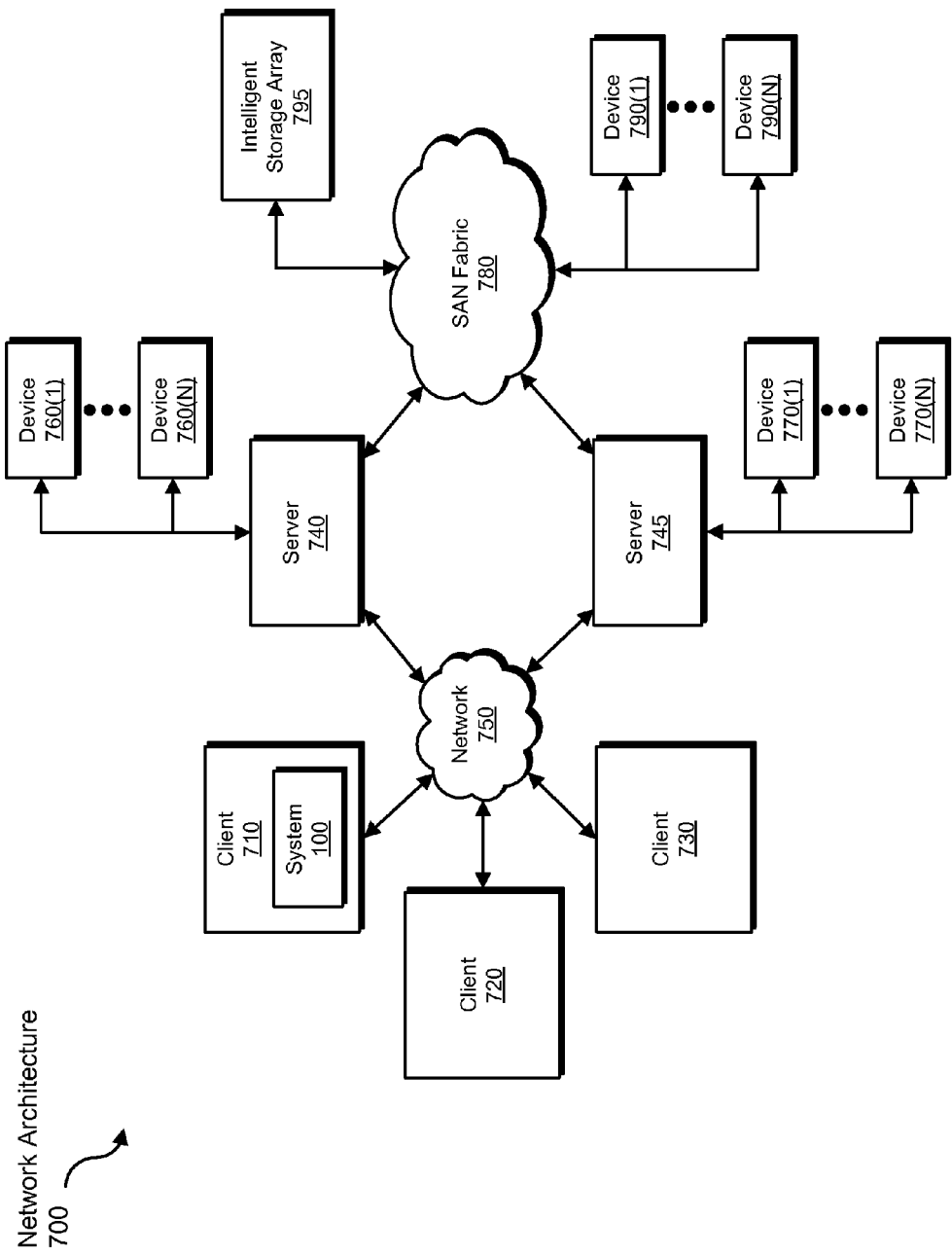
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, determining, tracking, performing, presenting, locking, changing, using, and removing steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for preventing mobile device loss.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive historical location data to be transformed, transform the historical location data into a security assessment, output the result of the security assessment to a mobile computing device, use the result of the transformation to secure the mobile computing device, and store the result of the assessment to a security server. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for preventing mobile device loss, at least a portion of the method being performed by a computing device comprising at least one processor, the method comprising:
   identifying historical data specifying a plurality of past locations of a plurality of mobile computing devices;
   identifying a current location of a mobile computing device within the plurality of mobile computing devices;
   determining that the current location deviates from an expected location based on the historical data by:
      determining, based on the historical data, that the mobile computing device is expected to be in proximity to an additional mobile computing device within the plurality of mobile computing devices responsive to the additional mobile computing device being within a predetermined geographical region;
      determining that the additional mobile computing device is within the predetermined geographical region;
      determining that the mobile computing device is not in proximity to the additional mobile computing device;
   performing a security measure on the mobile computing device in response to determining that the current location deviates from the expected location.

2. The computer-implemented method of claim 1, wherein identifying the historical data specifying the plurality of past locations of the plurality of mobile computing devices comprises determining that the plurality of mobile computing devices are owned by a single user.

3. The computer-implemented method of claim 1,
   further comprising identifying a current time; wherein:
   the historical data specifies a plurality of times corresponding to the plurality of past locations of the plurality of mobile computing devices;
   determining that the current location deviates from the expected location based on the historical data comprises determining that the current location deviates from the expected location given the current time.

4. The computer-implemented method of claim 1, wherein determining that the current location deviates from the expected location comprises determining that the current location deviates from the expected location by a distance beyond a predetermined threshold.

5. The computer-implemented method of claim 1, wherein determining that the current location deviates from the expected location based on the historical data comprises determining, based on the historical data, that the expected location of the mobile computing device comprises a location within a relative distance of the additional mobile computing device within the plurality of mobile computing devices.

6. The computer-implemented method of claim 1, further comprising tracking the location of the mobile computing device to generate the historical data.

7. The computer-implemented method of claim 1, wherein determining that the current location deviates from an expected location based on the historical data comprises determining, based on the historical data, that a statistical likelihood of the mobile computing device being at the current location at a current time falls below a predetermined threshold.

8. The computer-implemented method of claim 1, wherein performing the security measure on the mobile computing device comprises presenting a challenge via an interface of the mobile computing device to verify that an authorized user of the mobile computing device is in possession of the mobile computing device.

9. The computer-implemented method of claim 1, wherein performing the security measure on the mobile computing device comprises at least one of:
 locking the mobile computing device;
 changing an access code for the mobile computing device;
 using a media capture device within the mobile computing device;
 removing sensitive data from the mobile computing device.

10. A system for preventing mobile device loss, the system comprising:
 an identification module programmed to identify historical data specifying a plurality of past locations of a plurality of mobile computing devices;
 a location module programmed to identify a current location of a mobile computing device within the plurality of mobile computing devices;
 a determination module programmed to determine that the current location deviates from an expected location based on the historical data by:
  determining, based on the historical data, that the mobile computing device is expected to be in proximity to an additional mobile computing device within the plurality of mobile computing devices responsive to the additional mobile computing device being within a predetermined geographical region;
  determining that the additional mobile computing device is within the predetermined geographical region;
  determining that the mobile computing device is not in proximity to the additional mobile computing device;
 a performing module programmed to perform a security measure on the mobile computing device in response to determining that the current location deviates from the expected location;
 at least one processor configured to execute the identification module, the location module, the determination module, and the performing module.

11. The system of claim 10, wherein the identification module is programmed to identify the historical data specifying the plurality of past locations of the plurality of mobile computing devices by determining that the plurality of mobile computing devices are owned by a single user.

12. The system of claim 10, wherein:
 the location module is further programmed to identify a current time;
 the historical data specifies a plurality of times corresponding to the plurality of past locations of the plurality of mobile computing devices;
 the determination module is programmed to determine that the current location deviates from the expected location based on the historical data by determining that the current location deviates from the expected location given the current time.

13. The system of claim 10, wherein the determination module is programmed to determine that the current location deviates from the expected location by determining that the current location deviates from the expected location by a distance beyond a predetermined threshold.

14. The system of claim 10, wherein the determination module is programmed to determine that the current location deviates from the expected location based on the historical data by determining, based on the historical data, that the expected location of the mobile computing device comprises a location within a relative distance of the additional mobile computing device within the plurality of mobile computing devices.

15. The system of claim 10, wherein the identification module is further programmed to track the location of the mobile computing device to generate the historical data.

16. The system of claim 10, wherein determining that the current location deviates from an expected location based on the historical data comprises determining, based on the historical data, that a statistical likelihood of the mobile computing device being at the current location at a current time falls below a predetermined threshold.

17. The system of claim 10, wherein performing the security measure on the mobile computing device comprises presenting a challenge via an interface of the mobile computing device to verify that an authorized user of the mobile computing device is in possession of the mobile computing device.

18. A non-transitory computer-readable medium comprising one or more computer-executable instructions that, when executed by at least one processor of a computing device, cause the computing device to:
 identify historical data specifying a plurality of past locations of a plurality of mobile computing devices;
 identify a current location of a mobile computing device within the plurality of mobile computing devices;
 determine that the current location deviates from an expected location based on the historical data by:
  determining, based on the historical data, that the mobile computing device is expected to be in proximity to an additional mobile computing device within the plurality of mobile computing devices responsive to the additional mobile computing device being within a predetermined geographical region;
  determining that the additional mobile computing device is within the predetermined geographical region;
  determining that the mobile computing device is not in proximity to the additional mobile computing device;
 perform a security measure on the mobile computing device in response to determining that the current location deviates from the expected location.

19. The computer-readable medium of claim 18, wherein the one or more computer-executable instructions cause the computing device to identify the historical data specifying the plurality of past locations of the plurality of mobile computing devices by causing the computing device to determine that the plurality of mobile computing devices are owned by a single user.

20. The computer-readable medium of claim 19, wherein:
the one or more computer-executable instructions further cause the computing device to identify a current time;
the historical data specifies a plurality of times corresponding to the plurality of past locations of the plurality of mobile computing devices;
one or more computer-executable instructions cause the computing device to determine that the current location deviates from the expected location based on the historical data by causing the computing device to determine that the current location deviates from the expected location given the current time.

* * * * *